(12) United States Patent
Sledz

(10) Patent No.: US 8,074,959 B2
(45) Date of Patent: Dec. 13, 2011

(54) LOAD LINE APPARATUS

(75) Inventor: Joseph P. Sledz, Calgary (CA)

(73) Assignee: Sledz Industries Inc., Calgary (CA)

( * ) Notice: Subject to any disclaimer, the term of this patent is extended or adjusted under 35 U.S.C. 154(b) by 884 days.

(21) Appl. No.: 12/032,596

(22) Filed: Feb. 15, 2008

(65) Prior Publication Data

US 2009/0205722 A1 Aug. 20, 2009

(30) Foreign Application Priority Data

Feb. 14, 2008 (CA) .................................... 2626158

(51) Int. Cl.
*F16K 25/00* (2006.01)
*F16L 29/00* (2006.01)

(52) U.S. Cl. ......... 251/89.5; 251/95; 251/111; 251/113; 251/148

(58) Field of Classification Search .................. 137/383; 251/89, 95, 111, 113, 149.9, 326, 89.5, 148; 141/346

See application file for complete search history.

(56) References Cited

U.S. PATENT DOCUMENTS

| | | | | |
|---|---|---|---|---|
| 400,128 A | * | 3/1889 | Shepherd | 137/269 |
| 879,393 A | * | 2/1908 | Levilly | 62/223 |
| 1,052,088 A | * | 2/1913 | Prettyman | 251/89.5 |
| 3,314,698 A | * | 4/1967 | Owens | 285/312 |
| 4,030,524 A | * | 6/1977 | McMath et al. | 137/614.06 |
| 4,426,063 A | | 1/1984 | Bormioli | |
| 4,483,366 A | | 11/1984 | Labita | |
| 4,538,746 A | * | 9/1985 | Hines | 222/153.09 |
| 4,647,075 A | * | 3/1987 | Vargo | 285/82 |
| 6,021,823 A | | 2/2000 | Hale | |
| 6,736,367 B2 | * | 5/2004 | Scobie | 251/149.9 |
| 7,117,884 B2 | | 10/2006 | Shuter | |
| 7,147,004 B1 | | 12/2006 | Hartman | |
| 2001/0009876 A1 | | 7/2001 | Kurohata | |

* cited by examiner

*Primary Examiner* — Stephen M Hepperle
*Assistant Examiner* — Jonathan Waddy
(74) *Attorney, Agent, or Firm* — Christensen O'Connor Johnson Kindness PLLC

(57) ABSTRACT

An apparatus is provided which prevents the removal of a companion fitting when the valve is open. Thus, for example there is disclosed a load line apparatus comprising a housing, a valve, a cam lever, or more likely a pair of cam levers, and a locking device. The housing has an interior bore, the interior bore defining a flow-through passage. The valve has a surface shaped to close the flow-through passage when the valve is closed. The cam lever is pivotally attached to the housing, and the locking device is movable by the cam lever. The cam lever is operable between a locked position and an unlocked position. In the locked position, the locking device forms a stop to prevent the valve being opened. In the unlocked position, the locking device is retracted from the locked position. The cam lever is operable from the unlocked position into the locked position only when the valve is closed. The load line apparatus disclosed prevents the valve from being opened unless the cam lever is the unlocked position. The load line valve may also prevent a pipe fitting from being uncoupled with a coupling end of the pipe when the valve is opened.

11 Claims, 8 Drawing Sheets

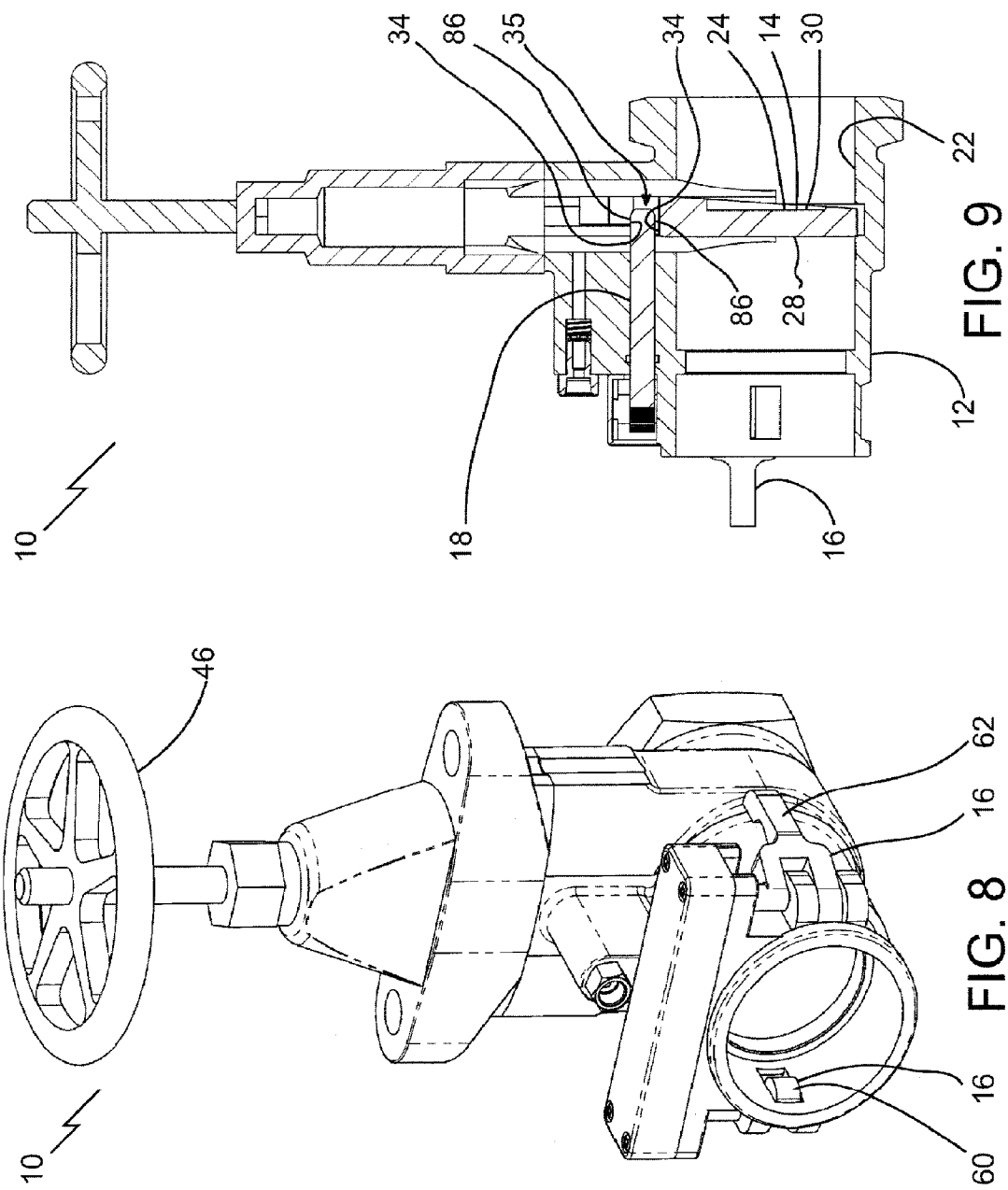

US 8,074,959 B2

LOAD LINE APPARATUS

TECHNICAL FIELD

Load line apparatus and methods, load line valves, and valved pipe assemblies for inputting or extracting fluids from a container.

BACKGROUND

Load line valves may be used by truckers to transfer fluid between containers. A companion fitting is attached to the valve, the valve is opened and fluid transfer of product is facilitated from one container to the next by means of a pump. A difficulty can arise when a user removes the companion fitting while the valve is still open, thus causing a fluid spill. Fluid spills may have detrimental effects to the environment, and should be prevented. In addition, it may be difficult to stem the fluid flow once it has started, as the fluid flow may make attempts to close the valve or reattach the companion fitting swiftly to the valve difficult.

SUMMARY

An apparatus is provided which prevents the removal of a companion fitting when the valve is open. Thus, for example there is disclosed a load line apparatus comprising a housing, a valve, a cam lever, or more likely a pair of cam levers, and a locking device. The housing has an interior bore, the interior bore defining a flow-through passage. The valve has a surface shaped to close the flow-through passage when the valve is closed. The cam lever is pivotally attached to the housing, and the locking device is movable by the cam lever. The cam lever is operable between a locked position and an unlocked position. In the locked position, the locking device forms a stop to prevent the valve being opened. In the unlocked position, the locking device is retracted from the locked position. The cam lever is operable from the unlocked position into the locked position only when the valve is closed.

A method of operating a load line valve in a housing is also disclosed. A pipe fitting is coupled to a coupling end of the housing. A cam lever, of one or more cam levers, is operated to move a locking device to unlock the load line valve while the load line valve is closed. The valve is opened to allow fluid transfer to occur between the housing and the pipe fitting and to prevent the operation of the cam lever. The valve is then closed, and the cam lever operated to move the locking device to lock the load line valve while the load line valve is closed. The pipe fitting is then uncoupled from the coupling end of the housing.

Another method of operating a load line valve in a housing is also disclosed. A cam lever is operated to move a locking device to unlock the load line valve while the load line valve is closed. The valve is opened to allow fluid transfer to occur through the housing and to prevent the operation of the cam lever. The valve is then closed, and the cam lever operated to move a locking device to lock the load line valve while the load line valve is closed.

A method of safely operating a load line valve in a pipe is also disclosed. A cam lever is operated, the cam lever being operatively connected to lock and unlock the load line valve. The load line valve is operated to open and close the load line valve. Operation of the cam lever is prevented unless the valve is closed.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 8 is a perspective view of a further embodiment of a load line valve with a gate valve in the unlocked position.

FIG. 9 is a side elevation view, partially in section, of the load line valve of FIG. 8. in the locked position.

DETAILED DESCRIPTION

Immaterial modifications may be made to the embodiments described here without departing from what is covered by the claims.

This document relates to, for example, shut off valves where product is inputted or extracted through a valve into a container. People who generally use these valves are, for example, truckers who attach a companion fitting to the valve, open the valve, and transfer product from one container to the next by means of a pump. An exemplary application may include loading oil or gas from a storage container into a transport truck for transport. Apparatus 10 may be used with fluids under pressure, for example in the storage of fluids under pressure, or the transfer of fluids under pressure.

Figure 1:
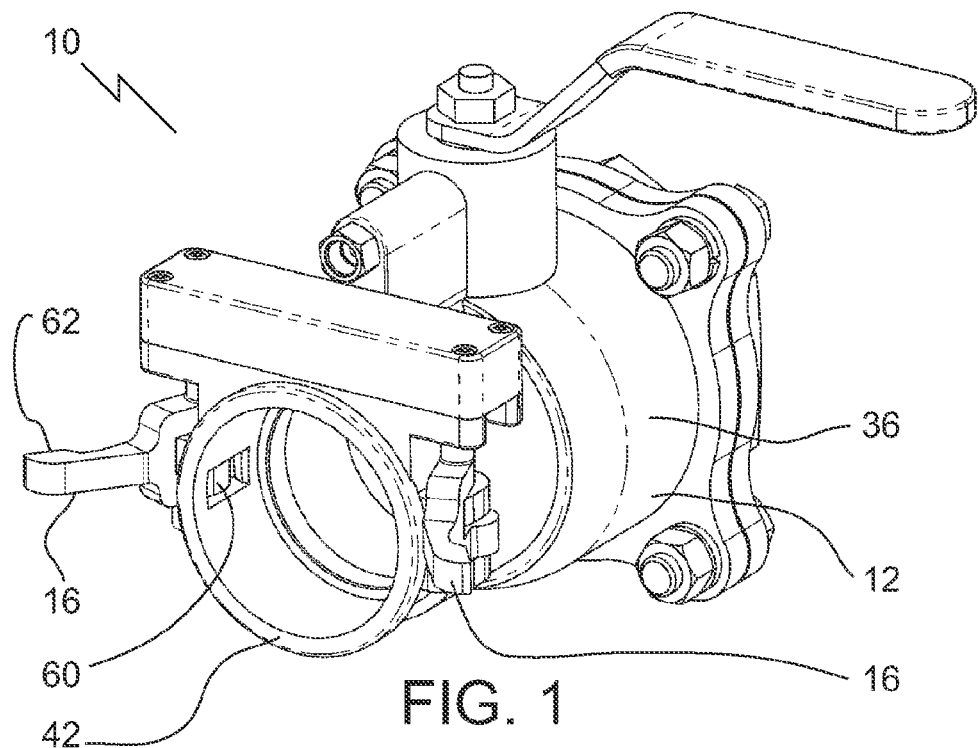
FIG. 1 is a perspective view of a load line valve with a ball valve in the locked position.
Figure 3:
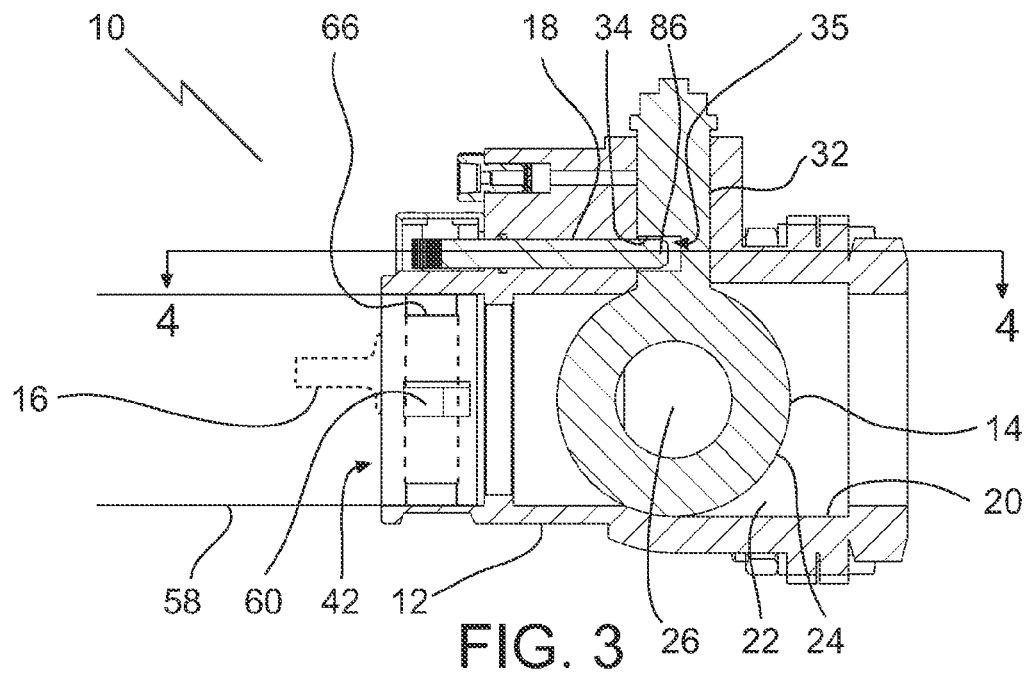
FIG. 3 is a side elevation view, partially in section, of the load line valve of FIG. 1 in the locked position.

Referring to FIG. 1, a load line apparatus 10 is illustrated. Referring to FIG. 3, apparatus 10 comprises a housing 12, a valve 14, a cam lever 16, and a locking device 18. Housing 12 has an interior bore 20 defining a flow-through passage 22. Housing 12 may be part of a pipe, for example. In other embodiments, housing 12 may have various shapes. Valve 14 has a surface 24 shaped to close flow-through passage 22 when valve 14 is closed. Valve 14 may be, for example, any type of valve known and used in the art, as well as any type of valve known or unknown that could be adapted to open and close flow-through passage 22. Valve 14 may be, for example, a butterfly valve, a plunger valve, a quarter-turn valve, a ball valve (shown in FIGS. 3-6 and 7), a gate valve (shown in FIGS. 9-10), or a plug valve. Referring to FIGS. 3 and 9, different embodiments of apparatus 10 are illustrated with valve 14 closed. More specifically, these embodiments illustrate different surfaces 24 shaped to close flow-through passage 22. Referring to FIG. 3, valve 14 is a ball valve, surface 24 is the corresponding outer ball surface. Referring to FIGS. 3 and 5, valve 14 may have a central passage 26 that allows fluid to pass through valve 14 when valve 14 is open (shown in FIG. 5). Referring to FIG. 9, valve 14 is a gate valve, and surface 24 is the corresponding front and back surfaces 28 and 30, respectively, of the gate itself. In this embodiment, valve 14 may be positioned at least partially out of flow-through passage 22 in order to allow fluids to pass through housing 12 when valve 14 is open.

Referring to FIG. 3, valve 14 may have a valve stem 32 upon which a lock surface 34 is positioned. Valve stem 32 may, for example, have any shape, may include other parts. Lock surface 34 may be a recess or opening 35 in the valve stem 32, for example. In some embodiments, locking device 18 forms the stop with valve stem 32 of valve 14 in the locked position. In some embodiments, lock surface 34 may be, for example a slot, a groove, a hole, or a passage. In the embodiment of FIG. 3, lock surface 34 is illustrated as a slot extending laterally at least partially within valve stem 32. In some embodiments, lock surface 34 may comprise a cut-away portion (not shown), or a friction surface (not shown). In some embodiments, lock surface 34 may be located anywhere on valve 14.

Referring to FIG. 1, cam lever 16 may be pivotally attached to housing 12. Pivotally attached may mean, for example, attachment to any part of housing 12, or any part appended to housing 12. In the embodiment illustrated in FIG. 1, cam lever 16 is attached to an exterior surface 36 of housing 12. Cam lever 16 may have multiple pivot points. Referring to the embodiments shown in FIGS. 1-10, a pair of cam levers 16 is illustrated. In some embodiments, apparatus 10 includes one or more of cam levers 16. In embodiments where more than one cam lever 16 is present, cam levers 16 may be operable individually, or together as a group. In further embodiments, each cam lever 16 must be in the unlocked position prior to opening valve 14. Referring to FIG. 3, the unlocked position may be described as any position where locking device 18 is not extended at all into opening 35.

Figure 4:
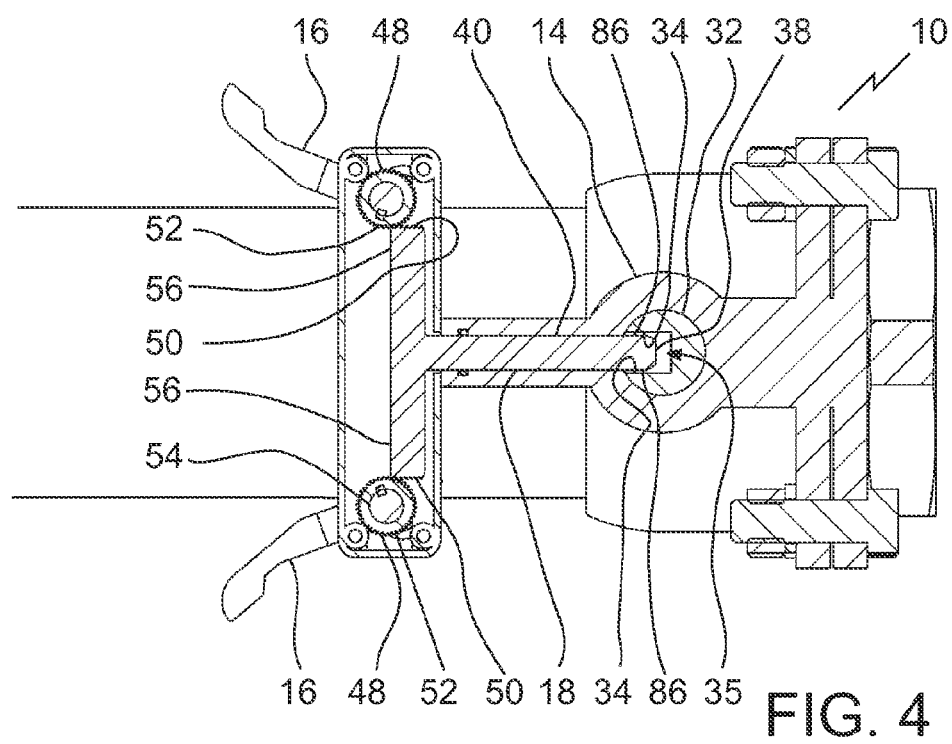
FIG. 4 is a top plan section view along the 4-4 lines of FIG. 3, of the load line valve of FIG. 1 in the locked position.
Figure 5:
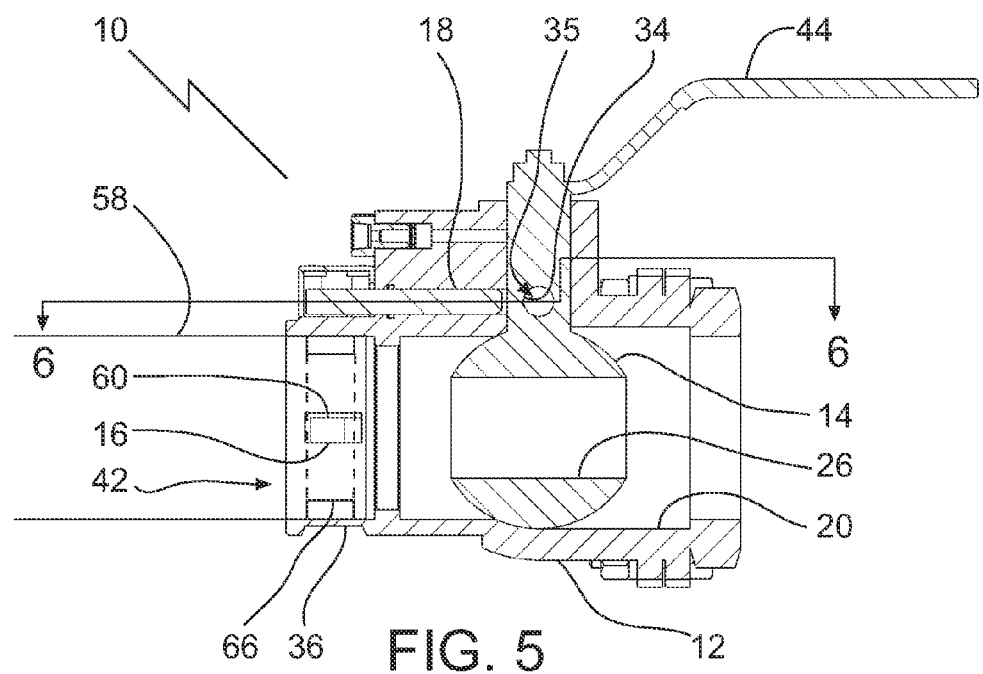
FIG. 5 is a side elevation view, partially in section, of the load line valve of FIG. 1 in the unlocked position.
Figure 6:
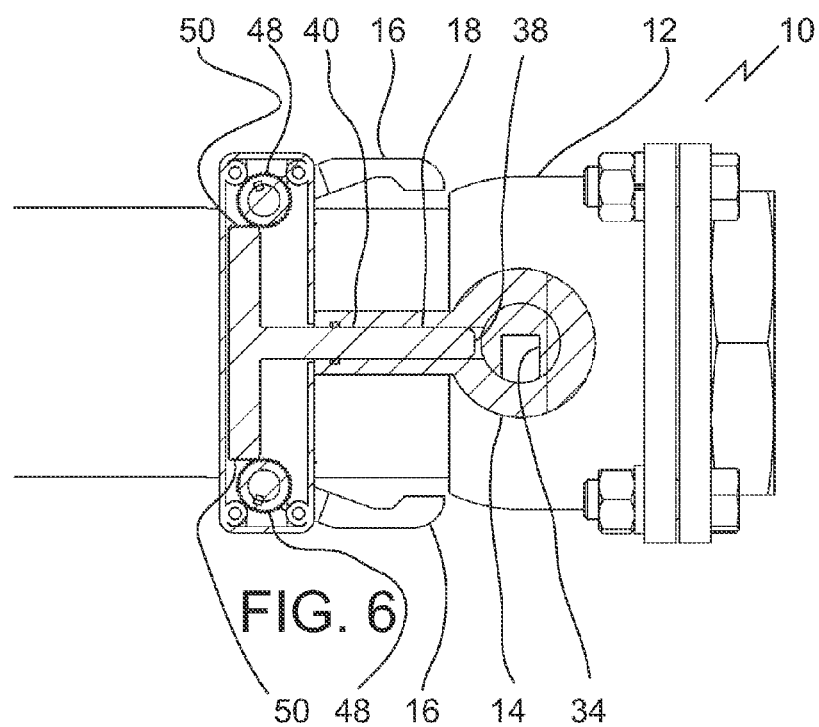
FIG. 6 is a section view along the 6-6 lines of FIG. 5, of the load line valve of FIG. 1 in the unlocked position.

Referring to FIGS. 4 and 6, locking device 18 is movable by cam levers 16. Locking device 18 may be, for example, an extendable plunger having an engagement end 38 and an elongated body 40 as illustrated in the Figures. In other embodiments, locking device 18 may be any type of locking device movable by cam levers 16 between engagement and disengagement with locking surface 34. Cam levers 16 are operable between a locked position (illustrated in FIGS. 1, 3, 4, 7, and 9), and an unlocked position (illustrated in FIGS. 2, 5, 6, 8, and 10). Referring to FIG. 1, when cam levers 16 are in the locked position, cam levers 16 may be rotated backwards, extending outwards from a coupling end 42 of housing 12.

Referring to FIG. 4, when cam levers 16 are in the locked position, locking device 18 forms a stop to prevent valve 14 being opened. Referring to FIGS. 4 and 9, in order to form the stop, locking device 18 may have a stop surface 86 that is abutted by a lock surface 34 in the event that an attempt to open valve 14 is made while cam levers 16 are in the locked position. The stop may be any type of stop. Lock surface may be formed on, for example, a shoulder, a ledge a recess, or a button. The lock surface 34 may be, for example, any type of surface that extends from or is located within valve stem 32. Lock surface 34 may be integral to valve stem 32, or provided as a separate piece. Stop surface 86 may be located at or near engagement end 38. In some embodiments, locking device 18 may incorporate other components to form the stop. In such embodiments, stop surface 86 may be located on the other component. For example, locking device 18 may be formed by a plunger and locking cam combination. The plunger is operatively connected to move a lever arm attached to a cam that has a cam surface that is engageable with the valve stem. Pressure of the cam surface on the valve stem stops motion of the valve stem. Hence, in this case, the cam, which forms part of the locking device, forms the stop when the locking device is in the locked position.

Referring to FIG. 4, locking device 18 may form a stop by, for example, having a plunger extending at least partially into the recess defined by lock surface 34 as shown. Similarly, locking device 18 may, for example, have some part that is engagable with lock surface 34. In some embodiments, if a user attempts to open valve 14 while locking device 18 is locked, locking device 18 will at some point engage lock surface 34 and prevent valve 14 from being opened. In the embodiment shown in FIG. 4, this is illustrated with valve 14 as a ball valve, in which valve 14 may not be rotated to open valve 14 when locking device 18 is engaged. In some embodiments, locking device 18 may not be directly in contact or engagement with lock surface 34 of valve 14 as shown, although if valve 14 is moved or rotated, engagement end 38 will inevitably come into contact with lock surface 34 and prevent any further movement. Similarly, in the embodiment illustrated in FIG. 9, locking device 18 prevents valve 14 (shown as a gate valve) from being retracted from housing 12 to open flow-through passage 22.

Figure 10:
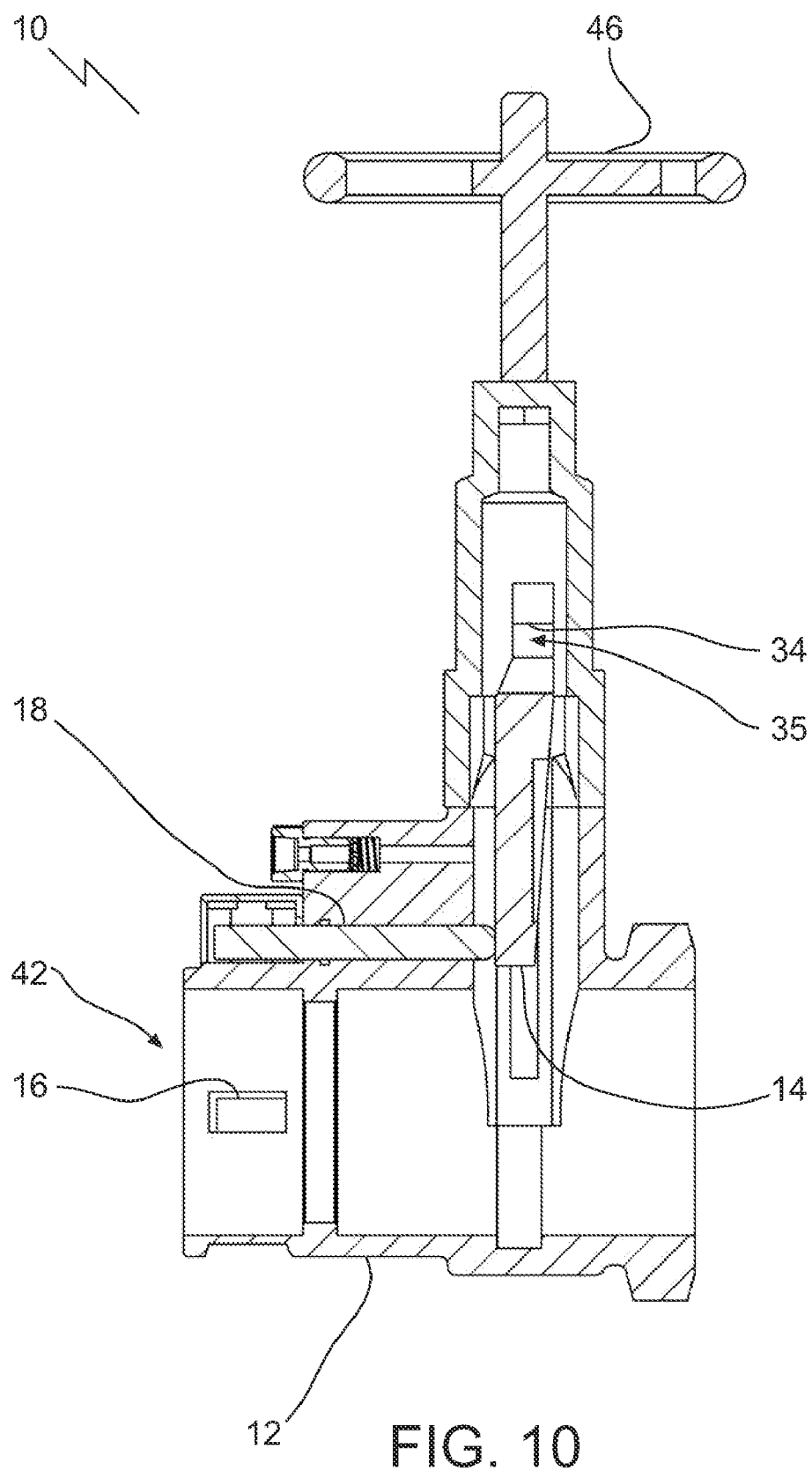
FIG. 10 is a side elevation view, in section, of the load line valve of FIG. 8 in the unlocked position.

Referring to FIG. 6, when cam levers 16 are in the unlocked position, cam levers 16 may be rotated forwards, fitting closely up across housing 12 as shown. Referring to FIG. 6, when cam levers 16 are in the unlocked position, locking device 18 has a part that is retracted from the locked position. In some embodiments, in the unlocked position, locking device 18 has a part that is retracted from opening 35 of valve 14. This is illustrated in FIGS. 5 and 10 with a ball valve and a gate valve, respectively. With locking device 18 retracted from opening 35, valve 14 may be freely opened. Referring to FIG. 5, valve 14 has been opened by turning handle 44 into the configuration shown. Referring to FIG. 10, valve 14 has been opened by rotating wheel 46 to raise and open valve 14. Referring to both FIGS. 5 and 10, cam levers 16 may not be operated from the unlocked position as shown into the locked position (illustrated in FIGS. 3 and 9, respectively) unless valve 14 is closed. As illustrated, only when valve 14 is closed is opening 35 in alignment to receive a part of locking device 18 to lock valve 14. In some embodiments, cam levers 16 may not be operated from the locked into the unlocked position unless a pipe fitting 58 is coupled to coupling end 42 of housing 12.

Referring to FIGS. 4 and 6, cam levers 16 comprise a rotatable surface 48 engagable by a tangential surface 50 of locking device 18 for movement of locking device 18. In the embodiment shown, each one of a pair of rotatable surfaces 48 individually engages one of a pair of corresponding tangential surfaces 50. Tangential surfaces 50 are called as such because they contact rotatable surface 48 at a tangent to rotatable surface 48 for the transfer of rotational movement from cam levers 16 to back or forth movement of locking device 18. Rotatable surfaces 48 may be engagable by tangential surfaces 50 through ribs, teeth, grooves, or friction. Referring to FIG. 4, in the embodiment illustrated, rotatable surfaces 48 are located on a gear 52 connected for rotation to cam lever 16. Gear 52 may be connected for rotation to cam lever 16 through a common axial connector 54. Common axial connector 54 may be, for example, a pipe or rod. Tangential surfaces 48 may be positioned on an arm or arms 56 of locking device 18. In some embodiments (not shown), locking device 18 may be pivotally attached to cam lever 16. In such embodiments, locking device 18 may be operatively connected to cam lever 16 for rotation through a hinged rotating arm. When cam lever 16 is rotated, the hinged arm or arms would then transfer rotational motion into retracting and extending motion of locking device 18 with opening 35. In similar embodiments, locking device 18 may be in hinged attachment with cam lever 18. In further embodiments, cam lever 16 may be operatively connected to locking device 18 through a swingarm with multiple pivot points hingedly attached to locking device 18.

Figure 2:
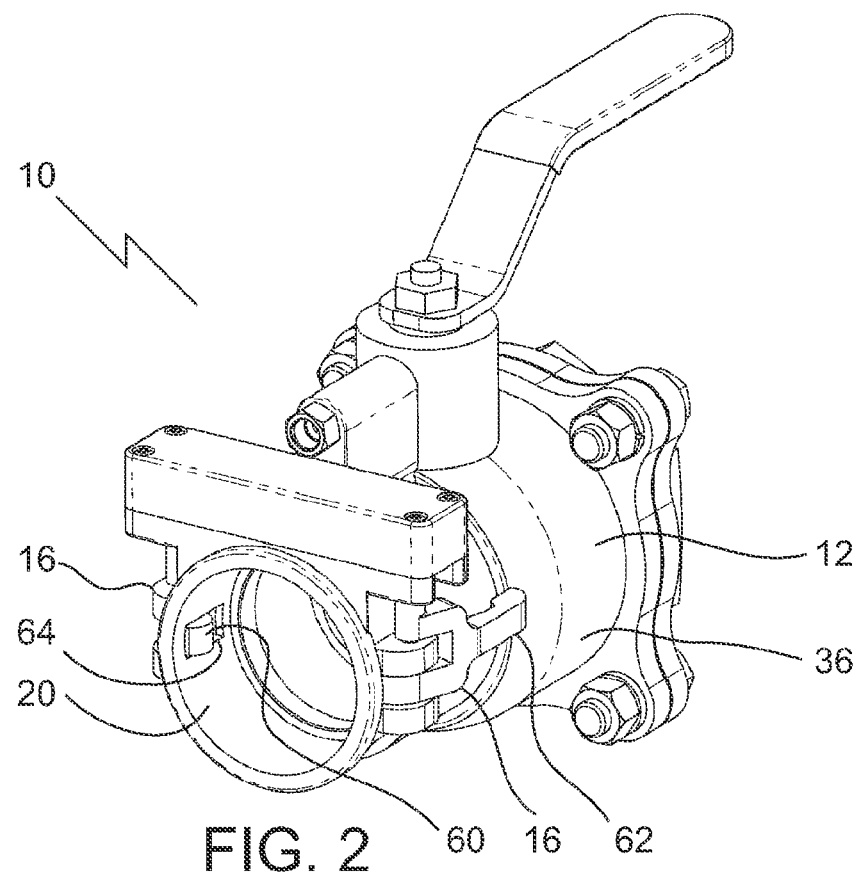
FIG. 2 is a perspective view of the load line valve of FIG. 1 in the unlocked position.
Figure 7:
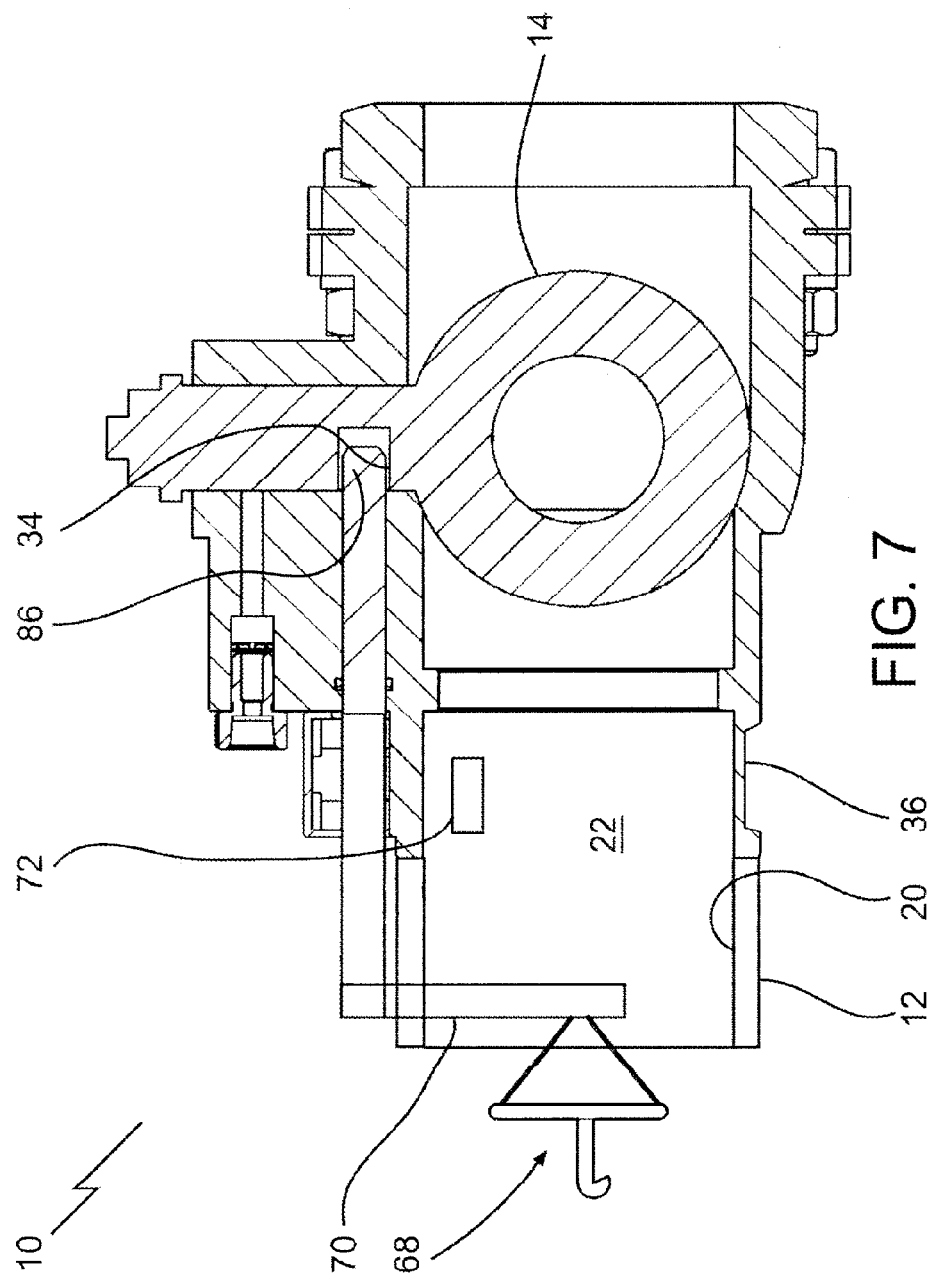
FIG. 7 is a side elevation view, partially in section, of another embodiment of a load line valve with a pipe fitting latch, in the locked position.

Referring to FIGS. 1, 2, and 8, cam lever 16 may comprise a cam end 60 and a handle arm 62. Handle arm 62 may be gripped for operating cam levers 16. Referring to FIG. 2, cam end 60 may extend into interior bore 20 of housing 12 through a cam hole 64 in exterior surface 36 when cam lever 16 is unlocked. Referring to FIG. 5, cam end 60 is engagable with pipe fitting 58 coupled to coupling end 42 of housing 12 to prevent pipe fitting 58 from being de-coupled when cam levers 16 are in the unlocked position. Cam end 60 may extend into, for example, a groove 66 in pipe fitting 58 when cam lever 16 is in the unlocked position. In other embodiments, cam end 60 may be engagable with, for example, a slot, latch, hole, opening or other locking mechanism on pipe fitting 58 to lock pipe fitting 58. Cam end 60 may prevent pipe fitting 58 from being removed when cam levers 16 are in the unlocked position. Similarly, cam end 60 may prevent pipe fitting 58 from coupling to coupling end 42 when cam levers 16 are in the unlocked position. Pipe fitting 58 may be insertable into interior bore 20 as shown, or extendable over exterior surface 36 of housing 12 when pipe fitting 58 is coupled to housing 12. In some embodiments, cam levers 16 may be prevented from being operated from the locked position into the unlocked position unless pipe fitting 58 is coupled to coupling end 42. This adds an extra degree of safety to apparatus 10, as valve 14 cannot be opened unless pipe fitting 58 is coupled to housing 12 for fluid transfer. This embodiment of apparatus 10 may be incorporated by, for example, causing pipe fitting 58 to flip a switch or switching mechanism within interior bore 20 upon coupling to housing 12 that, unless flipped, prevents the operation of cam levers 16. Referring to FIG. 7, cam levers 16 may comprise a latch 68 operatively connected to cam lever 16, in which latch 68 is engageable with pipe fitting 58 (not shown) when cam lever 16 is in the unlocked position. Latch 68 may be operatively connected by an arm 70 which is external to or at least partially internal within housing 12. If internal, arm 70 may pass into interior bore 20 through a slot (not shown) in exterior surface 36, where it may latch to pipe fitting 58. If external, latch 68 may engage a corresponding latching device (not shown) present on the exterior of pipe fitting 58.

Referring to FIG. 7, in some embodiments, housing 12 may further comprise a one-way valve 72. One-way valve 72 may be, for example, a check valve. One-way valve 72 may be, for example, on the suction side of valve 14 as shown. One-way valve 72 allows air into flow-through passage 22 to prevent the possibility of a container (not shown) collapsing when product is removed too fast through housing 12, creating a vacuum. One-way valve 72 may be adjustable, in order to set an activation pressure threshold. When pressure within interior bore 20 falls below the activation pressure threshold, one-way valve 72 may release air into flow-through passage 22 to compensate and prevent container collapse. Because valve 72 is a one-way valve, fluids within housing 12 do not transfer through one-way valve 72 to outside of housing 12.

Figure 11:
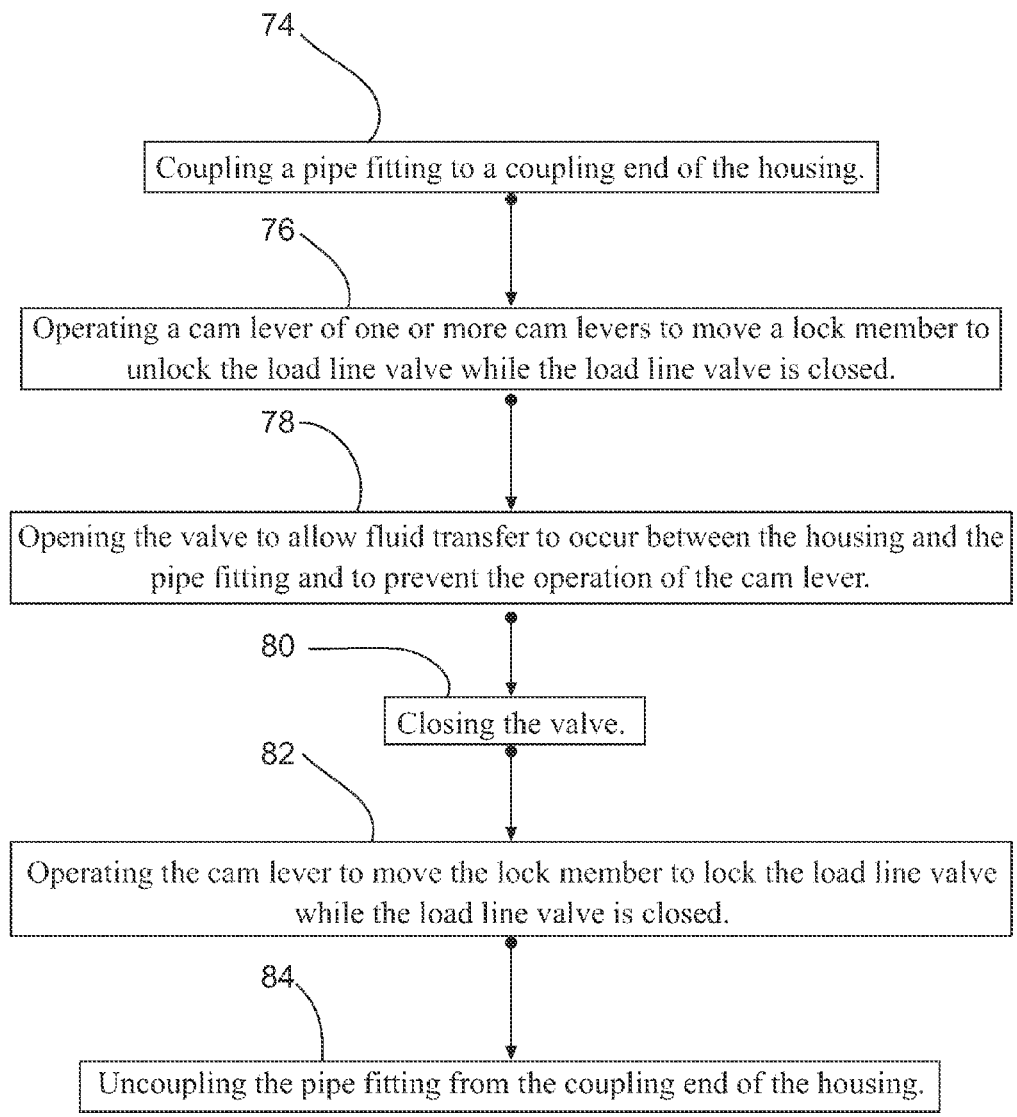
FIG. 11 is a flow diagram illustrating a method of operating a load line valve in a pipe.

Referring to FIG. 11, a method of operating a load line valve is illustrated. Referring to FIG. 3, in step 74 (shown in FIG. 11), pipe fitting 58 is coupled to coupling end 42 of housing 12. Coupling may comprise inserting pipe fitting 58 into, or extending pipe fitting 58 overtop of, coupling end 42 of housing 12. Referring to FIG. 5, in step 76 (shown in FIG. 11), cam levers 16 are operated to move locking device 18 to unlock load line valve 14 while valve 14 is closed. Cam levers 16 may be operated by rotating cam levers 16 inwards. When cam levers 16 are operated to move locking device 18 to unlock valve 14, they may also lock pipe fitting 58 to coupling end 42 of housing 12 in the process. Operating cam levers 16 to move locking device 18 to unlock may further comprise retracting a removable plunger (illustrated as locking device 18) from forming a stop with lock surface 34 of valve 14, as described above.

Referring to FIG. 5, in step 78 (shown in FIG. 11) valve 14 is opened to allow fluid transfer to occur between housing 12 and pipe fitting 58 and to prevent the operation of cam levers 16. At this point, a pump (not shown) may be turned on to facilitate fluid transfer through housing 12. Pipe fitting 58 may be, for example, a pipe connecting to a transport truck, whereas housing 12 may be connected to, for example, a gasoline storage container. In step 80 (shown in FIG. 11), upon completion of the desired amount of fluid transfer, valve 14 is closed. Upon valve 14 being closed, opening 35 is aligned with the range of motion of locking device 18. Referring to FIG. 3, in step 82 (shown in FIG. 11), cam lever 16 is operated to move locking device 18 to lock valve 14 while valve 14 is closed. If valve 14 is not fully closed, opening 35 may not be in proper alignment with the extension range of locking device 18. Cam levers 16 may be operated by rotating cam levers 16 outwards, back to their initial positions. When cam levers 16 are operated to move locking device 18 to lock, cam levers 16 may also unlock pipe fitting 58 from coupling end 42 of housing 12. This may be accomplished by retracting cam end 60 from cam engagement with groove 66 of pipe fitting 58. Similarly, when cam levers 16 are operated to move locking device 18 to lock valve 14, they may also extend removable plunger (illustrated as locking device 18) into opening 35 of valve 14. Referring to FIG. 1, in step 84 (shown in FIG. 11) pipe fitting 58 is uncoupled from coupling end 42 of housing 12.

Figure 12:
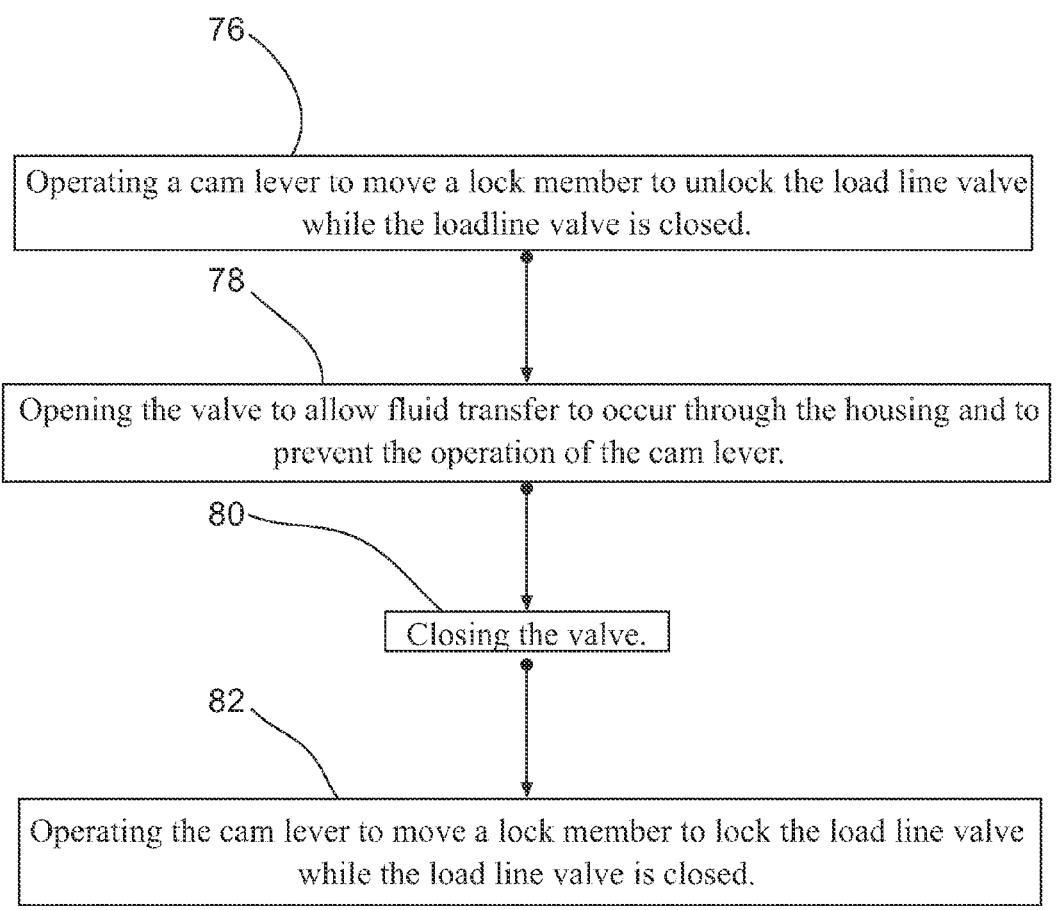
FIG. 12 is a flow diagram illustrating another embodiment of a method of operating a load line valve in a pipe.

Referring to FIG. 12, another embodiment of a method of operating a load line valve is illustrated. The method as illustrated in FIG. 12 is an embodiment of the method illustrated in FIG. 11, with the exception that steps 74 and 84 are removed. This method may be used when no pipe fitting 58 is required, for example when emptying the fluid contents of a container into a bin or other open storage container. Similarly, this method may be used if valve 14 has been adapted as a line valve as part of a regular piping system. In this method, cam levers 16 are provided in order to prevent accidental or unintentional opening of valve 14, or merely as a backup safety feature.

Apparatus 10 may not allow valve 14 to open unless a companion fitting (illustrated as pipe fitting 58) is attached and locked in by means of a lever actuator (illustrated as cam levers 16). The fitting cannot be removed until the valve is in the closed position. This will eliminate the possibility of leaving the valve opened or attempting to remove the companion fitting while the valve is opened.

Any of the components of the embodiments of apparatus 10 described herein may be electronically or mechanically controlled. Similarly, operation of any of the components of apparatus 10 may be carried out through the use of motors, pulleys, or any other type of mechanical systems. Apparatus 10 may also be hand operated, or operated through the use of conventional or special tools. In some embodiments, any or all of the components may have attached sensors, in order to detect the orientation of the components of apparatus 10. This may be provide an additional safety system that may alert an operator to, for example, the operation of cam levers when no pipe fitting has been coupled to the housing 12.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. A load line apparatus comprising:
    a housing having an interior bore, the interior bore defining a flow-through passage;
    a valve having a valve stem and a surface shaped to close the flow-through passage when the valve is closed;
    a pair of cam levers pivotally attached to the housing on opposed sides of the housing; and
    a locking device movable by rotation of at least one cam lever of the cam levers, the locking device comprising an extendable plunger that moves linearly in response to rotation of the at least one cam lever;
    the at least one cam lever being operable between a locked position in which the locking device forms a stop to prevent the valve being opened by rotation of the at least one cam lever causing the extendable plunger to move linearly and engage the valve stem, and an unlocked position in which the locking device is retracted from the locked position and from the valve stem, the cam lever being operable from the unlocked position into the locked position only when the valve is closed.

2. The load line apparatus of claim 1, in which the at least one cam lever rotates about an axis and the locking device is attached to the at least one cam lever in a rack and pinion configuration where the rack is on the locking device and the pinion is on an extension of the at least one cam lever extending parallel to the axis of the at least one cam lever.

3. The load line apparatus of claim 1, in which the valve is a butterfly valve, a plunger valve, a quarter-turn valve, a ball valve, a gate valve, or a plug valve.

4. The load line apparatus of claim 1 in which a cam end of the at least one cam lever is engagable with a pipe fitting coupled to a coupling end of the housing to prevent the pipe fitting from being de-coupled when the at least one cam lever is in the unlocked position.

5. The load line apparatus of claim 4, in which the cam end is extended into a groove on the pipe fitting when the at least one cam lever is in the unlocked position.

6. The load line apparatus of claim 4, in which the cam end is extended into the interior bore of the housing through a cam hole in the external surface of the housing when the at least one cam lever is in the unlocked position.

7. The load line apparatus of claim 1 further comprising a latch operatively connected to the at least one cam lever, in which the latch is engageable with a pipe fitting when the at least one cam lever is in the unlocked position.

8. A method of operating a load line valve in a housing, the method comprising:
    coupling a pipe fitting to a coupling end of the housing;
    rotating at least a cam lever of a pair of cam levers to lock the pipe fitting to the coupling end of the housing with a cam on the at least a cam lever engaging a groove on the pipe fitting and to move a locking device linearly out of engagement with a valve stem of the load line valve to unlock the load line valve while the load line valve is closed;
    opening the valve to allow fluid transfer to occur between the housing and the pipe fitting and to prevent the operation of the at least a cam lever;
    closing the valve;
    rotating the at least a cam lever to unlock the pipe fitting to the coupling end of the housing and to move the locking device linearly into engagement with the valve stem to lock the load line valve while the load line valve is closed; and
    uncoupling the pipe fitting from the coupling end of the housing.

9. The method of claim 8 in which the at least a cam lever further comprises a latch engagable with the pipe fitting.

10. The method of claim 8 in which operating the at least a cam lever to move the locking device to unlock further comprises retracting a removable plunger from a recess of the load line valve, and in which operating the at least a cam lever to move the locking device to lock further comprises extending the removable plunger into the recess of the load line valve.

11. The method of claim 8, in which operating the at least a cam lever to move the locking device to unlock further comprises operating the pair of cam levers, and in which operating the at least a cam lever to move the locking device to lock further comprises operating the pair of cam levers.

* * * * *